(12) United States Patent
Quan et al.

(10) Patent No.: US 10,264,489 B2
(45) Date of Patent: Apr. 16, 2019

(54) METHOD AND APPARATUS FOR REPORTING UNLICENSED SPECTRUM CAPABILITY

(71) Applicant: Huawei Technologies Co., Ltd., Shenzhen, Guangdong (CN)

(72) Inventors: Wei Quan, Beijing (CN); Xiaodong Yang, Beijing (CN); Zhenxing Hu, Shenzhen (CN); Bingzhao Li, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/247,578

(22) Filed: Aug. 25, 2016

(65) Prior Publication Data
US 2016/0366618 A1 Dec. 15, 2016

Related U.S. Application Data

(63) Continuation of application No. PCT/CN2014/072521, filed on Feb. 25, 2014.

(51) Int. Cl.
*H04W 28/18* (2009.01)
*H04W 16/14* (2009.01)
*H04W 72/04* (2009.01)

(52) U.S. Cl.
CPC .......... *H04W 28/18* (2013.01); *H04W 16/14* (2013.01); *H04W 72/0453* (2013.01)

(58) Field of Classification Search
CPC .............. G06F 15/0225; H01H 13/702; H01H 13/703; H04W 16/14; H04W 28/18; H04W 72/0453
See application file for complete search history.

(56) References Cited

U.S. PATENT DOCUMENTS

| 9,301,302 B2* | 3/2016 | Sundberg .......... H04W 72/0453 |
| 2011/0228666 A1* | 9/2011 | Barbieri ................ H04W 76/14 |
| | | 370/216 |
| 2012/0243450 A1 | 9/2012 | Ishii et al. |
| 2013/0143502 A1 | 6/2013 | Kazmi et al. |

(Continued)

FOREIGN PATENT DOCUMENTS

| CN | 101378579 A | 3/2009 |
| CN | 101605334 A | 12/2009 |

(Continued)

OTHER PUBLICATIONS

Qualcomm et al.; "Introducing LTE in Unlicensed Spectrum"; 3GPP RAN #62; RP-131635; Busan, South Korea; Dec. 3-7, 2013; 8 pages.

*Primary Examiner* — Liton Miah

(57) ABSTRACT

The present invention discloses a method and an apparatus for reporting an unlicensed spectrum capability The method includes the following: UE reports a list of unlicensed spectrums that can be supported by the UE and a maximum bandwidth value of each unlicensed spectrum to a serving base station of the UE, so that the serving base station of the UE can configure an unlicensed spectrum resource for the UE according to a received unlicensed spectrum capability parameter. Therefore, a base station can configure an unlicensed spectrum resource according to unlicensed spectrum capabilities that can be supported by different UEs.

10 Claims, 4 Drawing Sheets

(56) References Cited

U.S. PATENT DOCUMENTS

2013/0344883 A1* 12/2013 Rinne ............... H04W 72/0453
  455/452.1
2015/0103741 A1   4/2015 Uchino et al.
2015/0215471 A1*  7/2015 Ljung ................... H04M 15/58
  455/405

FOREIGN PATENT DOCUMENTS

| CN | 102932927 A | 2/2013 |
| CN | 103069882 A | 4/2013 |
| CN | 103517456 A | 1/2014 |
| EP | 2844011 A1 | 3/2015 |
| JP | 2013102289 A | 5/2013 |
| JP | 2013225753 A | 10/2013 |
| WO | 2012/162875 A1 | 12/2012 |
| WO | 2011043392 A1 | 3/2013 |

* cited by examiner

METHOD AND APPARATUS FOR REPORTING UNLICENSED SPECTRUM CAPABILITY

CROSS-REFERENCE TO RELATED APPLICATIONS

This application is a continuation of International Patent Application No. PCT/CN2014/072521, filed on Feb. 25, 2014, which is incorporated herein by reference in its entirety.

TECHNICAL FIELD

The present invention relates to the field of broadband access technologies, and in particular, to a method and an apparatus for reporting an unlicensed spectrum capability.

BACKGROUND

At present, a fixed-spectrum allocation policy is used for spectrum management in most countries. A government department manages and allocates spectrums to regular authorized users, and operators acquire usage rights for a segment of spectrum by means of purchasing. Strictly limited and protected spectrums are referred to as licensed (licensed) spectrums. However, bandwidths of the licensed spectrums are extremely limited, and as users have an increasing demand on mobile broadband services, licensed spectrum resources can no longer meet this demand. However, a large quantity of unlicensed (unlicensed) spectrum resources have not been used effectively. Therefore, to use the unlicensed spectrum resources effectively to meet more demands on the mobile broadband services, applying an Long-term Evolution (LTE) device to an unlicensed spectrum has become a development trend of spectrum resource utilization by the operators. One feasible solution to unlicensed spectrum resource utilization is that an unlicensed spectrum is configured for LTE user equipment by an LTE base station device and used as an secondary cell (Scell) of the LTE user equipment, so that the LTE base station can perform data communication with the LTE user equipment by using the unlicensed spectrum.

However, when the LTE base station device directly configures an unlicensed spectrum resource for the user equipment, a case may occur in which the user equipment cannot use a spectrum resource allocated to the user equipment.

SUMMARY

Embodiments of the present invention provide a method and an apparatus for reporting an unlicensed spectrum capability, so as to resolve a problem that, when an LTE base station device directly configures an unlicensed spectrum resource for user equipment, a case may occur in which the user equipment cannot use a spectrum resource allocated to the user equipment, thereby affecting data transmission performance of the user equipment.

To achieve the foregoing objective, the following technical solutions are adopted in the embodiments of the present invention:

According to a first aspect, an embodiment of the present invention provides UE for reporting an unlicensed spectrum capability, where the UE includes:

a reporting module, configured to report an unlicensed spectrum capability parameter of the UE to a serving base station of the UE, where the unlicensed spectrum capability parameter is used to indicate information about an unlicensed spectrum supported by the UE, and the information includes a list of unlicensed spectrums supported by the UE and a maximum bandwidth value of each unlicensed spectrum.

With reference to the first aspect, in a first possible implementation manner, the reporting module is further configured to send the unlicensed spectrum capability parameter to the serving base station by using an uplink RRC message, send the unlicensed spectrum capability parameter to the serving base station by using a MAC layer message, or send the unlicensed spectrum capability parameter to the serving base station by using a PHY layer message.

With reference to a second possible implementation manner of the first aspect, in a third possible implementation manner, the reporting module is further configured to report an unlicensed spectrum capability parameter that includes one or more of the following: a quantity of unlicensed spectrums that can be used simultaneously by a serving cell that can be supported by the UE, a quantity of unlicensed spectrums and licensed spectrums that can be used simultaneously by a serving cell that can be supported by the UE, a spectrum range of an unlicensed spectrum that can be used by a serving cell that can be supported by the UE, a spectrum range of an unlicensed spectrum and a licensed spectrum that can be used by a serving cell that can be supported by the UE, or a duplex mode that can be used by a serving cell that can be supported by the UE.

According to a second aspect, the present invention further provides a base station for reporting an unlicensed spectrum capability, including:

a receiving module, configured to receive an unlicensed spectrum capability parameter sent by the UE; and a configuration module, configured to configure an unlicensed spectrum serving cell for the UE according to the unlicensed spectrum capability parameter.

With reference to the second aspect, in a first possible implementation manner, the configuration module further includes:

a selection unit, configured to perform one or more of the following: select, according to an unlicensed spectrum list in the unlicensed spectrum capability parameter, at least one spectrum in the unlicensed spectrum list; and/or obtain, by means of screening, an unlicensed spectrum that is in the selected unlicensed spectrum and whose bandwidth value is less than or equal to a maximum bandwidth value of an unlicensed spectrum in the unlicensed spectrum capability parameter; and/or select a proper quantity of unlicensed spectrums according to a quantity of unlicensed spectrums that can be used simultaneously by a serving cell that can be supported by the UE, and according to a quantity of unlicensed spectrums and licensed spectrums that can be used simultaneously by the serving cell that can be supported by the UE, where the quantities are in the unlicensed spectrum capability parameter; and/or select an unlicensed spectrum that has a proper spectrum range according to a spectrum range of an unlicensed spectrum that can be used by the serving cell that can be supported by the UE, and according to a spectrum range of an unlicensed spectrum and a licensed spectrum that can be used by the serving cell that can be supported by the UE, where the spectrum ranges are in the unlicensed spectrum capability parameter; and/or select a proper duplex mode according to a duplex mode that can be used by the serving cell that can be supported by the UE, where the duplex mode is in the unlicensed spectrum capability parameter; and a configuration unit, configured to determine the selected unlicensed spectrum as a secondary cell of the UE and configure the secondary cell as the unlicensed spectrum serving cell of the UE.

With reference to the first possible implementation manner of the second aspect, in a second possible implementation manner, the base station further includes a notification module;

the receiving module is further configured to: when the UE is in a dual-connected state, receive the unlicensed spectrum capability parameter sent by the UE, where the dual-connected state refers to a state in which the UE is simultaneously served by two or more base stations; and receive configuration information sent by a secondary base station, where the configuration information refers to information about an unlicensed spectrum cell that the secondary base station configures for the UE according to the received unlicensed spectrum capability parameter;

the configuration module is further configured to configure an unlicensed spectrum cell for the UE according to the received unlicensed spectrum capability parameter; and the notification module is configured to send the unlicensed spectrum capability parameter to the secondary base station; and notify the UE of the unlicensed spectrum cells that are configured for the UE separately by the base station and the secondary base station, so that the UE can perform data transmission by using the unlicensed spectrum cells configured by the base station and the secondary base station.

According to a third aspect, an embodiment of the present invention provides a method for reporting an unlicensed spectrum capability, including:

reporting, by user equipment UE, an unlicensed spectrum capability parameter to a serving base station of the UE, where the unlicensed spectrum capability parameter is used to indicate information about an unlicensed spectrum supported by the UE, and the information includes a list of unlicensed spectrums supported by the UE and a maximum bandwidth value of each unlicensed spectrum.

With reference to the third aspect, in a first possible implementation manner of the third aspect, the reporting an unlicensed spectrum capability parameter to a serving base station of the UE includes:

sending, by the UE, the unlicensed spectrum capability parameter to the serving base station by using an uplink RRC message; or sending, by the UE, the unlicensed spectrum capability parameter to the serving base station by using a MAC layer message; or sending, by the UE, the unlicensed spectrum capability parameter to the serving base station by using a PHY layer message.

With reference to the first possible implementation manner of the third aspect, in a second possible implementation manner, the unlicensed spectrum capability parameter further includes one or more of the following: a quantity of unlicensed spectrums that can be used simultaneously by a serving cell that can be supported by the UE, a quantity of unlicensed spectrums and licensed spectrums that can be used simultaneously by a serving cell that can be supported by the UE, a spectrum range of an unlicensed spectrum that can be used by a serving cell that can be supported by the UE, a spectrum range of an unlicensed spectrum and a licensed spectrum that can be used by a serving cell that can be supported by the UE, or a duplex mode that can be used by a serving cell that can be supported by the UE.

According to a fourth aspect, an embodiment of the present invention provides a method for reporting an unlicensed spectrum capability, where the method includes:

receiving, by the base station, an unlicensed spectrum capability parameter sent by the UE, and configuring an unlicensed spectrum serving cell for the UE according to the unlicensed spectrum capability parameter.

With reference to the fourth aspect, in a first possible implementation manner of the fourth aspect, the configuring, by the base station, an unlicensed spectrum serving cell for the UE according to the unlicensed spectrum capability parameter includes:

selecting, by the base station according to an unlicensed spectrum list in the unlicensed spectrum capability parameter, at least one spectrum in the unlicensed spectrum list; and/or obtaining, by the base station by means of screening, an unlicensed spectrum that is in the selected unlicensed spectrum and whose bandwidth value is less than or equal to a maximum bandwidth value of an unlicensed spectrum in the unlicensed spectrum capability parameter; and/or selecting, by the base station, a proper quantity of unlicensed spectrums according to a quantity of unlicensed spectrums that can be used simultaneously by a serving cell that can be supported by the UE, and according to a quantity of unlicensed spectrums and licensed spectrums that can be used simultaneously by the serving cell that can be supported by the UE, where the quantities are in the unlicensed spectrum capability parameter; and/or selecting, by the base station, an unlicensed spectrum that has a proper spectrum range according to a spectrum range of an unlicensed spectrum that can be used by the serving cell that can be supported by the UE, and according to a spectrum range of an unlicensed spectrum and a licensed spectrum that can be used by the serving cell that can be supported by the UE, where the spectrum ranges are in the unlicensed spectrum capability parameter; and/or selecting, by the base station, a proper duplex mode according to a duplex mode that can be used by the serving cell that can be supported by the UE, where the duplex mode is in the unlicensed spectrum capability parameter; and determining, by the base station, the selected unlicensed spectrum as a secondary cell of the UE, and configuring the secondary cell as the unlicensed spectrum serving cell of the UE.

With reference to a first possible implementation manner of the fourth aspect, in a second possible implementation manner, the configuring, by the base station, an unlicensed spectrum serving cell for the UE according to the unlicensed spectrum capability parameter further includes:

receiving, by a master base station of the UE when the UE is in a dual-connected state, the unlicensed spectrum capability parameter sent by the UE, where the dual-connected state refers to a state in which the UE is simultaneously served by two or more base stations;

configuring, by the master base station, an unlicensed spectrum cell for the UE according to the received unlicensed spectrum capability parameter, and sending the unlicensed spectrum capability parameter to a secondary base station;

receiving, by the master base station, configuration information sent by the secondary base station, where the configuration information refers to information about an unlicensed spectrum cell that the secondary base station configures for the UE according to the received unlicensed spectrum capability parameter; and notifying, by the master base station, the UE of the unlicensed spectrum cells that are configured for the UE separately by the master base station and the secondary base station, so that the UE can perform data transmission by using the unlicensed spectrum cells configured by the master base station and the secondary base station.

In the method for reporting an unlicensed spectrum capability provided in the embodiments of the present invention, UE reports a list of unlicensed spectrums that can be supported by the UE and a maximum bandwidth value of each unlicensed spectrum to a serving base station of the UE, so that the serving base station of the UE can configure an unlicensed spectrum resource for the UE according to a received unlicensed spectrum capability parameter. Therefore, a base station can configure an unlicensed spectrum resource according to unlicensed spectrum capabilities that can be supported by different UEs, which avoids that the base station directly configures an unlicensed spectrum resource for user equipment, and resolves a problem that, when an LTE base station device directly configures an unlicensed spectrum resource for the user equipment, a case may occur in which the user equipment cannot use a spectrum resource allocated to the user equipment, thereby affecting data transmission performance of the user equipment.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
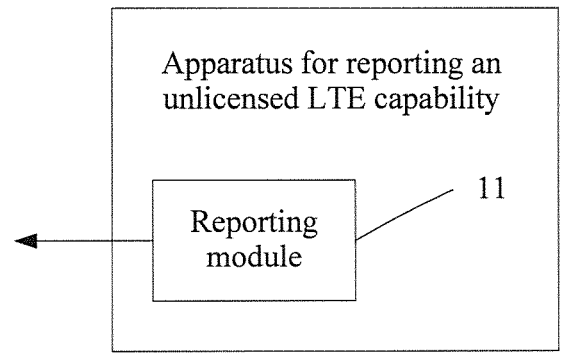
FIG. 1 is a schematic apparatus diagram of UE for reporting an unlicensed spectrum capability according to an embodiment of the present invention.

The present invention provides user equipment (UE) for reporting an unlicensed spectrum capability. As shown in FIG. 1, the UE is configured to implement a method process shown in FIG. 4, where the UE includes:

a reporting module 11, configured to report an unlicensed spectrum capability parameter of the UE to a serving base station of the UE, where the unlicensed spectrum capability parameter is used to indicate information about an unlicensed spectrum supported by the UE, and the information includes a list of unlicensed spectrums supported by the UE and a maximum bandwidth value of each unlicensed spectrum.

In addition, the reporting module 11 is further configured to: send the unlicensed spectrum capability parameter to the serving base station by using an uplink RRC message; or send the unlicensed spectrum capability parameter to the serving base station by using a media access control (MAC) layer message; or send the unlicensed spectrum capability parameter to the serving base station by using a PHY layer message.

In addition, the reporting module 11 is further configured to report the unlicensed spectrum capability parameter that includes one or more of the following: a quantity of unlicensed spectrums that can be used simultaneously by a serving cell that can be supported by the UE, a quantity of unlicensed spectrums and licensed spectrums that can be used simultaneously by a serving cell that can be supported by the UE, a spectrum range of an unlicensed spectrum that can be used by a serving cell that can be supported by the UE, a spectrum range of an unlicensed spectrum and a licensed spectrum that can be used by a serving cell that can be supported by the UE, or a duplex mode that can be used by a serving cell that can be supported by the UE.

Figure 2:
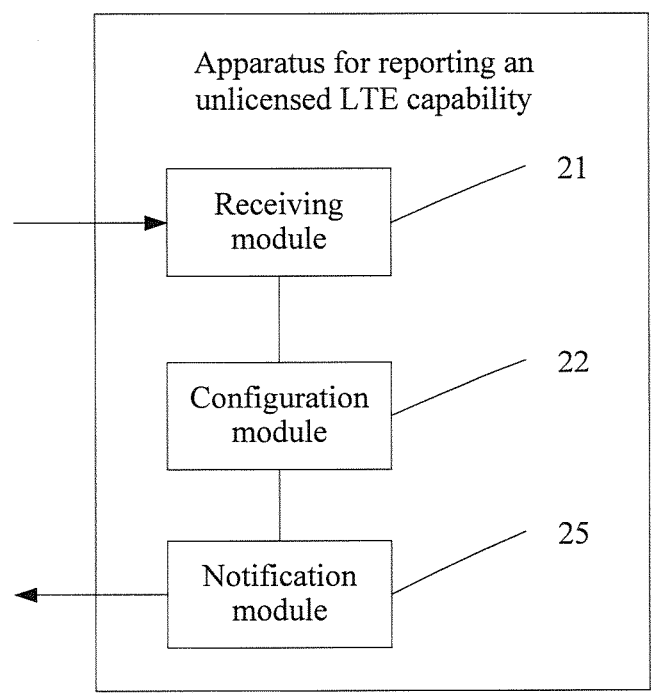
FIG. 2 is a schematic apparatus diagram of a base station for reporting an unlicensed spectrum capability according to an embodiment of the present invention.
Figure 3:
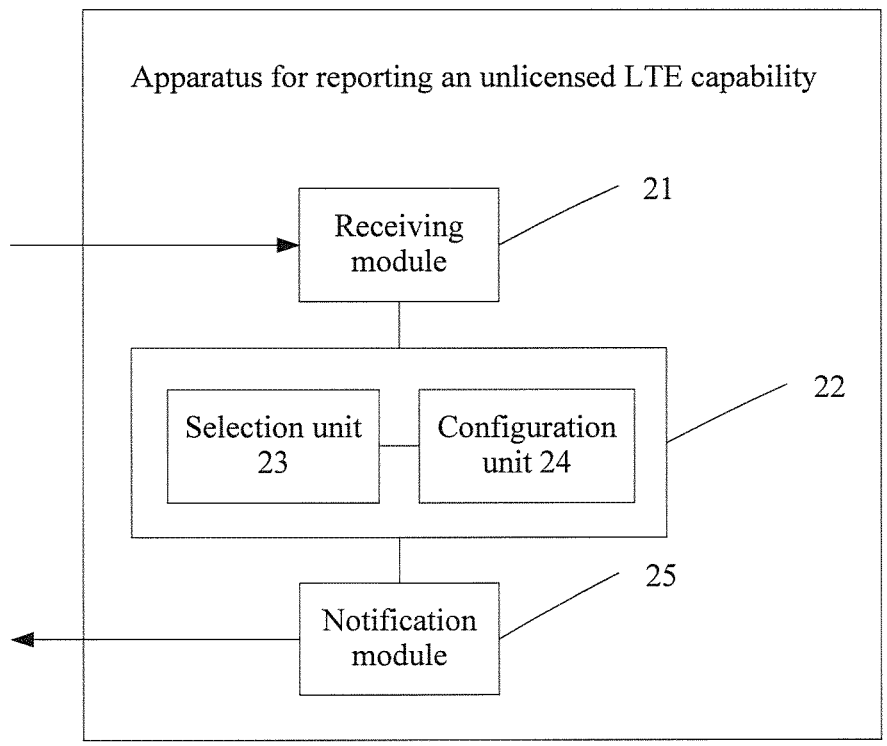
FIG. 3 is a schematic apparatus diagram of a base station for reporting an unlicensed spectrum capability according to an embodiment of the present invention.

Another embodiment of the present invention provides a base station for reporting an unlicensed spectrum capability. As shown in FIG. 2 and FIG. 3, the base station is configured to implement a method process shown in FIG. 5 or FIG. 6, where the base station includes:

a receiving module 21, configured to receive an unlicensed spectrum capability parameter sent by UE; and a configuration module 22, configured to configure an unlicensed spectrum serving cell for the UE according to the unlicensed spectrum capability parameter.

In addition, the configuration module 22 further includes:

a selection unit 23, configured to perform one or more of the following: select, according to an unlicensed spectrum list in the unlicensed spectrum capability parameter, at least one spectrum in the unlicensed spectrum list; obtain, by means of screening, an unlicensed spectrum that is in the selected unlicensed spectrum and whose bandwidth value is less than or equal to a maximum bandwidth value of an unlicensed spectrum in the unlicensed spectrum capability parameter; select a proper quantity of unlicensed spectrums according to a quantity of unlicensed spectrums that can be used simultaneously by a serving cell that can be supported by the UE, and according to a quantity of unlicensed spectrums and licensed spectrums that can be used simultaneously by a serving cell that can be supported by the UE, where the quantities are in the unlicensed spectrum capability parameter; select an unlicensed spectrum that has a proper spectrum range according to a spectrum range of an unlicensed spectrum that can be used by a serving cell that can be supported by the UE, and according to a spectrum range of an unlicensed spectrum and a licensed spectrum that can be used by a serving cell that can be supported by the UE, where the spectrum ranges are in the unlicensed spectrum capability parameter; or select a proper duplex mode according to a duplex mode that can be used by a serving cell that can be supported by the UE, where the duplex mode is in the unlicensed spectrum capability parameter; and a configuration unit 24, configured to determine the selected unlicensed spectrum as a secondary cell of the UE and configure the secondary cell as the unlicensed spectrum serving cell of the UE.

In addition, the base station further includes a notification module 25;

the receiving module 21 is further configured to: receive the unlicensed spectrum capability parameter sent by the UE when the UE is in a dual-connected state, where the dual-connected state refers to a state in which the UE is simultaneously served by two or more base stations; and receive configuration information sent by the secondary base station, where the configuration information refers to information about an unlicensed spectrum cell that the secondary base station configures for the UE according to received unlicensed spectrum capability parameter;

the configuration module 22 is further configured to configure an unlicensed spectrum cell for the UE according to the received unlicensed spectrum capability parameter; and the notification module 25 is configured to send the unlicensed spectrum capability parameter to the secondary base station; and notify the UE of the unlicensed spectrum cells that are configured for the UE separately by the master base station and the secondary base station, so that the UE can perform data transmission by using the unlicensed spectrum cells configured by the master base station and the secondary base station.

According to the apparatus for reporting an unlicensed spectrum capability provided in this embodiment of the present invention, UE reports a list, of unlicensed spectrums that can be supported by the UE and a maximum bandwidth value of each unlicensed spectrum to a serving base station of the UE; by using this method, the serving base station of the UE can configure an unlicensed spectrum resource for the UE according to a received unlicensed spectrum capability parameter. Therefore, a base station can configure an unlicensed spectrum resource according to unlicensed spectrum capabilities that can be supported by different UEs, which avoids that the base station directly configures an unlicensed spectrum resource for user equipment, and resolves a problem that, when an LTE base station device directly configures an unlicensed spectrum resource for the user equipment, a case may occur in which the user equipment cannot use a spectrum resource allocated to the user equipment, thereby affecting data transmission performance of the user equipment.

Figure 4:
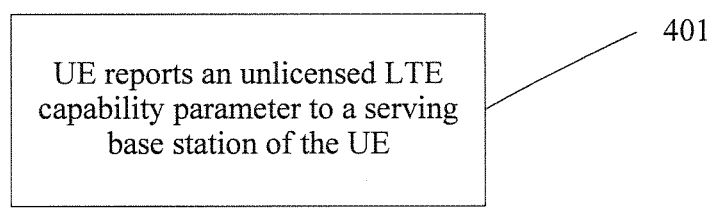
FIG. 4 is a flowchart of a method for reporting an unlicensed spectrum capability according to an embodiment of the present invention.

An embodiment of the present invention provides a method for reporting an unlicensed spectrum capability. An interaction process of the method is shown in FIG. 4, specifically including:

401. UE reports an unlicensed spectrum capability parameter to a serving base station of the UE.

The unlicensed spectrum capability parameter is used to indicate information about an unlicensed spectrum supported by the UE, where the information includes a list of unlicensed spectrums supported by the UE and a maximum bandwidth value of each unlicensed spectrum.

The UE sends the unlicensed spectrum capability parameter to the serving base station by using an uplink RRC message; or sends the unlicensed spectrum capability parameter to the serving base station by using a MAC layer message; or sends the unlicensed spectrum capability parameter to the serving base station by using a PHY layer message.

In addition, the unlicensed spectrum capability parameter of the UE further includes a quantity of unlicensed spectrums that can be used simultaneously used by a serving cell that can be supported by the UE, a quantity of unlicensed spectrums and licensed spectrums that can be used simultaneously by the serving cell that can be supported by the UE, a spectrum range of an unlicensed spectrum that can be used by the serving cell that can be supported by the UE, a spectrum range of an unlicensed spectrum and a licensed spectrum that can be used by the serving cell that can be supported by the UE, and a duplex mode that can be used by the serving cell that can be supported by the UE.

In addition, a manner in which the UE reports the unlicensed spectrum capability parameter may be that the UE directly reports the unlicensed spectrum capability parameter to the serving base station; or may be that the UE first reports its unlicensed spectrum capability to a core network, and then the core network notifies the serving base station of the unlicensed spectrum capability; or may be that the serving base station actively queries an unlicensed spectrum capability of the UE, and after receiving a corresponding query message, the UE reports the unlicensed spectrum capability of the UE to the serving base station. In addition, when the UE is handed over from a current serving base station to a new serving base station, the source serving base station may directly notify the new serving base station of an unlicensed spectrum capability, of the UE, obtained by the source serving base station.

In the method for reporting an unlicensed spectrum capability provided in this embodiment of the present invention, UE reports a list of unlicensed spectrums that can be supported by the UE and a maximum bandwidth value of each unlicensed spectrum to a serving base station of the UE, so that the serving base station of the UE can configure an unlicensed spectrum resource for the UE according to a received unlicensed spectrum capability parameter. Therefore, a base station can configure an unlicensed spectrum resource according to unlicensed spectrum capabilities that can be supported by different UEs, which avoids that the base station directly configures an unlicensed spectrum resource for user equipment, and resolves a problem that, when an LTE base station device directly configures an unlicensed spectrum resource for the user equipment, a case may occur in which the user equipment cannot use a spectrum resource allocated to the user equipment, thereby affecting data transmission performance of the user equipment.

Figure 5:
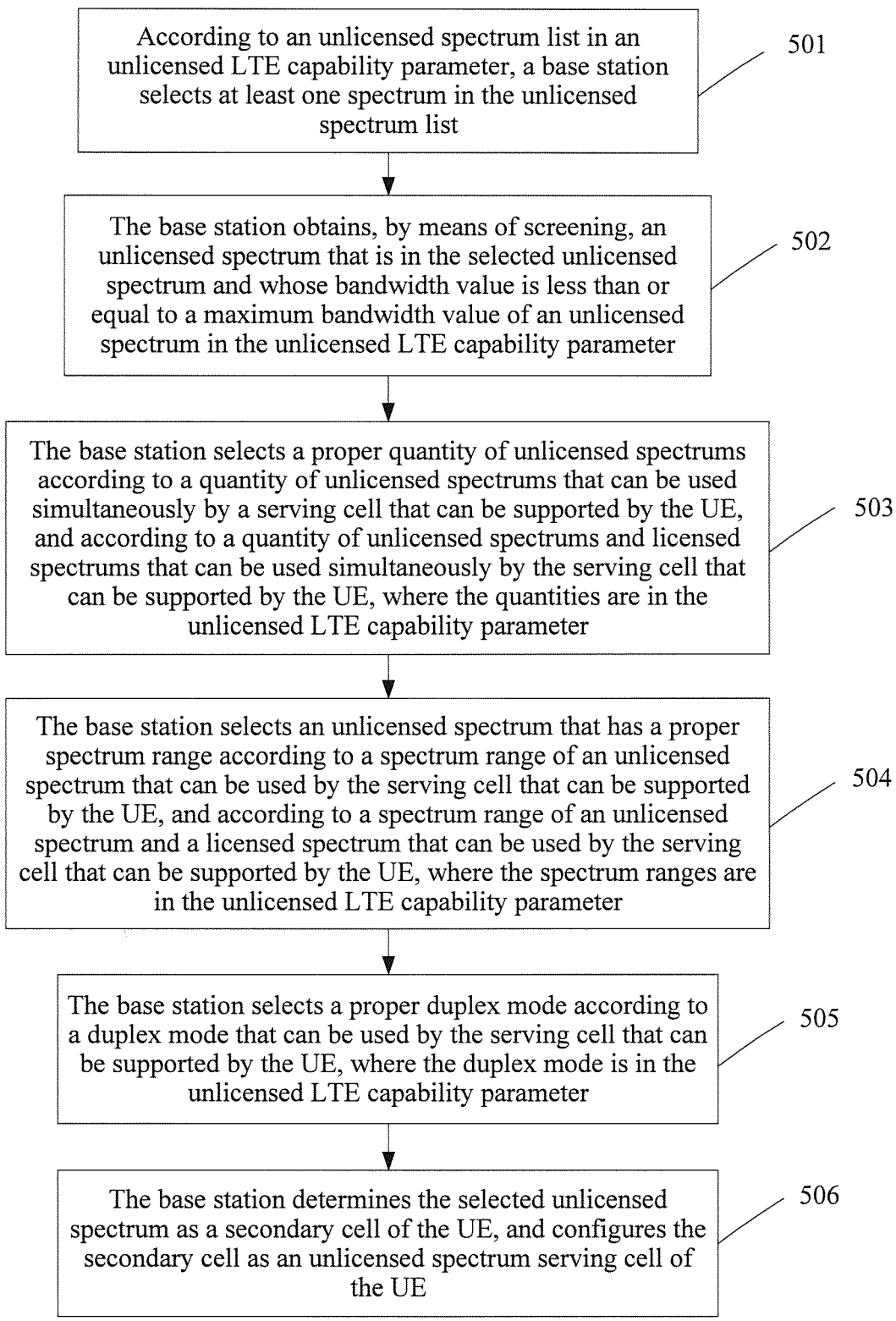
FIG. 5 is a flowchart of a method for configuring an unlicensed spectrum according to an embodiment of the present invention.

Further, in an implementation manner of an embodiment of the present invention, a method for configuring an unlicensed spectrum serving cell for UE by a base station according to an unlicensed spectrum capability parameter is provided. A method process of the method is shown in FIG. 5, including:

501. According to an unlicensed spectrum list in the unlicensed spectrum capability parameter, the base station selects at least one spectrum in the unlicensed spectrum list.

All unlicensed spectrums of the UE may be determined by a factor, such as use permission of the UE, and an unlicensed spectrum in a coverage area of a serving base station of the UE.

502. The base station sets a bandwidth value of the selected unlicensed spectrum to be less than or equal to a maximum bandwidth value of an unlicensed spectrum in the unlicensed spectrum capability parameter.

A spectrum bandwidth that can be supported by the UE is limited. When an excessive spectrum bandwidth is configured for the UE, the UE cannot fully use a data transmission rate that can be reached with respect to the spectrum bandwidth allocated to the UE, to receive data, which causes a bandwidth waste. Therefore, a bandwidth value of an unlicensed spectrum obtained by means of screening may be set to a value less than or equal to a maximum bandwidth value of an unlicensed spectrum that can be supported by the UE.

503. The base station selects a proper quantity of unlicensed spectrums according to a quantity of unlicensed spectrums that can be used simultaneously by a serving cell that can be supported by the UE, and according to a quantity of unlicensed spectrums and licensed spectrums that can be used simultaneously by the serving cell that can be supported by the UE, where the quantities are in the unlicensed spectrum capability parameter.

The proper quantity of unlicensed spectrums is less than or equal to the quantity of unlicensed spectrums that can be used simultaneously and the quantity of unlicensed spectrums and licensed spectrums that can be used simultaneously.

The UE may support multiple unlicensed spectrums and multiple licensed spectrums, and the multiple unlicensed spectrums may be used simultaneously by a serving cell of the UE. Certainly, in view of a limitation of performance of different UEs, quantities of spectrums that the UEs allow their serving cells to use simultaneously are different from each other. Therefore, the base station may be notified of quantities of unlicensed spectrums and licensed spectrums that can be used simultaneously by the serving cells that can be supported by the UEs, so that the base station can configure proper spectrum quantities according to support conditions of different UEs.

504. The base station selects an unlicensed spectrum that has a proper spectrum range according to a spectrum range of an unlicensed spectrum that can be used by the serving cell that can be supported by the UE, and according to a spectrum range of an unlicensed spectrum and a licensed spectrum that can be used by the serving cell that can be supported by the UE, where the spectrum ranges are in the unlicensed spectrum capability parameter.

Spectrum ranges of unlicensed spectrums that can be supported by different UEs are different, and ranges of unlicensed spectrums and licensed spectrums that can be supported by different UEs are also different. Therefore, if there is an excessively wide span between spectrums configured for the UE, the UE may not be able to normally use the configured spectrums. Therefore, when configuring an unlicensed spectrum cell for the UE, the base station needs to select an unlicensed spectrum within a specific frequency band range.

505. The base station selects a proper duplex mode according to a duplex mode that can be used by the serving cell that can be supported by the UE, where the duplex mode is in the unlicensed spectrum capability parameter.

An unlicensed spectrum serving cell supported by the UE may have multiple duplex modes, including one or more of TDD, FDD, FDD DL, FDD UL and half duplex FDD, where the TDD may also include a TDD uplink-downlink configuration that can be supported by the UE, where the TDD uplink-downlink configuration may be one or more of seven existing configurations, or may be a new uplink-downlink configuration. This embodiment of the present invention sets no more limitation thereto.

506. The base station determines the selected unlicensed spectrum as a secondary cell of the UE, and configures the secondary cell as an unlicensed spectrum serving cell of the UE.

A serving cell configured with the unlicensed spectrum is only used as the secondary cell of the UE, rather than a primary cell of the UE.

In addition, it should be noted that, in this embodiment of the present invention, a sequence of each step in a method process is not a practical processing sequence, and is only a possible processing sequence in a method implementation process. For a specific sequence of a processing step, sorting according to a practical situation.

It should be particularly noted that, the process step of this embodiment of the present invention is only an implementable manner of a solution of the present invention, where a sequence of steps may be rearranged according to a practical situation. This embodiment of the present invention sets no more limitation thereto.

In this implementation manner, screening is performed, on all unlicensed spectrums that can be used by UE, according to each parameter in an unlicensed spectrum capability parameter reported by the UE, finally an unlicensed spectrum obtained by means of screening is determined as a secondary cell of the UE, and the secondary cell is configured as an unlicensed spectrum serving cell of the UE This manner further illustrates a method about how a base station performs configuration after receiving an unlicensed spectrum capability parameter, so that the base station can better configure a proper unlicensed spectrum cell for the UE by using a parameter reported by the UE.

Figure 6:
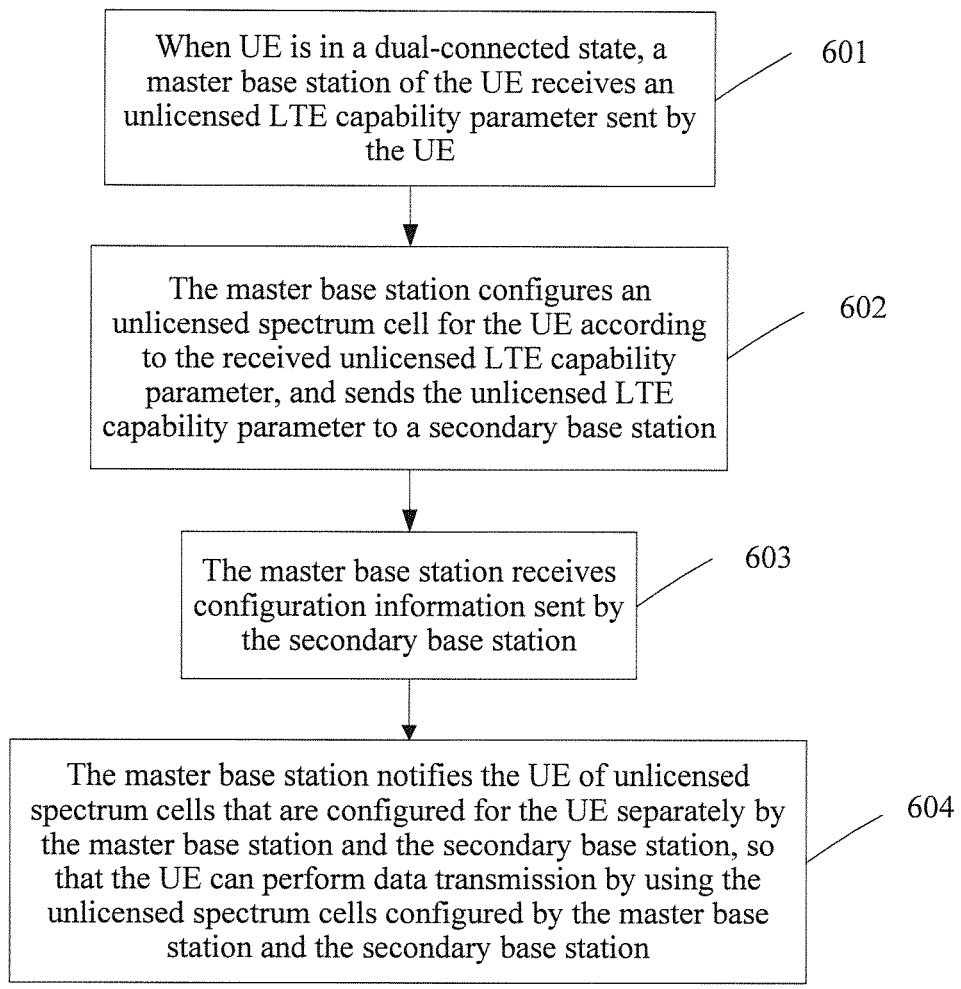
FIG. 6 is a flowchart of another method for configuring an unlicensed spectrum according to an embodiment of the present invention.

Further, in another implementation manner of an embodiment of the present invention, another method for configuring an unlicensed spectrum cell for UE by a base station is provided. The method is shown in FIG. 6, specifically including:

601. When the UE is in a dual-connected state, a master base station of the UE receives an unlicensed spectrum capability parameter sent by the UE.

The dual-connected state refers to a state in which the UE is simultaneously served by two or more base stations. A method for reporting the unlicensed spectrum capability parameter by the UE may use a reporting method adopted when a single base station provides a service.

602. The master base station configures an unlicensed spectrum cell for the UE according to the received unlicensed spectrum capability parameter, and sends the unlicensed spectrum capability parameter to a secondary base station.

A method for configuring the unlicensed spectrum cell for the UE may use the method in steps 501 to 506.

603. The master base station receives configuration information sent by the secondary base station.

The configuration information refers to information about an unlicensed spectrum cell that the secondary base station configures for the UE according to the received unlicensed spectrum capability parameter. In addition, a method for configuring the unlicensed spectrum cell for the UE may also use the method in steps 501 to 506.

604. The master base station notifies the UE of the unlicensed spectrum cells that are configured for the UE separately by the master base station and the secondary base station, so that the UE can perform data transmission by using the unlicensed spectrum cells configured by the master base station and the secondary base station.

A method for notifying, by the master base station, the UE of the unlicensed spectrum cells that are configured for the UE by the master base station and the secondary base station may be executed in a universal packet sending manner, or in a manner of replying to request information. This embodiment of the present invention sets no more limitation thereto.

In this implementation manner, when UE is in a dual-connected state, a master base station receives an unlicensed spectrum capability parameter sent by the UE and performs configuration, then the master base station sends the received unlicensed spectrum capability parameter to a secondary base station, the secondary base station can perform configuration according to the unlicensed spectrum capability parameter and send related configuration information to the master base station, and the master base station notifies the UE of information about configuration performed for the UE by the master base station and the secondary base station configures information. In this method, configuration for the UE in the dual-connected state is completed, so that the UE can perform data transmission according to a configured unlicensed spectrum cell, and a method in another case is provided for configuration of the UE, thereby improving implementability for configuring the unlicensed spectrum cell for the UE.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. User equipment (UE) for reporting an unlicensed spectrum capability when the UE is in a dual-connected state, the UE comprising:
    a processor, configured to report an unlicensed spectrum capability parameter of the UE to a serving base station of the UE, the unlicensed spectrum capability parameter for indicating information about an unlicensed spectrum supported by the UE, and the information comprises a list of unlicensed spectrums supported by the UE and a maximum bandwidth value of each unlicensed spectrum;
    wherein the unlicensed spectrum capability parameter comprises one or more of the following:
        a quantity of unlicensed spectrums that can be used simultaneously by a serving cell that can be supported by the UE,
        a quantity of unlicensed spectrums and licensed spectrums that can be used simultaneously by a serving cell that can be supported by the UE,
        a spectrum range of an unlicensed spectrum that can be used by a serving cell that can be supported by the UE,
        a spectrum range of an unlicensed spectrum and a licensed spectrum that can be used by a serving cell that can be supported by the UE, or
        a duplex mode that can be used by a serving cell that can be supported by the UE; and
    wherein the dual-connected state refers to a state in which the UE is simultaneously served by two or more base stations.

2. The UE according to claim 1, further comprising:
    a transmitter, configured to send the unlicensed spectrum capability parameter to the serving base station by using an uplink radio resource control (RRC) message, send the unlicensed spectrum capability parameter to the serving base station by using a media access control (MAC) layer message, or send the unlicensed spectrum capability parameter to the serving base station by using a physical (PHY) layer message.

3. A base station for reporting an unlicensed spectrum capability, the base station comprising:
    a receiver, configured to receive an unlicensed spectrum capability parameter sent by user equipment (UE) when the UE is in a dual-connected state, wherein the dual-connected state refers to a state in which the UE is simultaneously served by two or more base stations, and wherein the unlicensed spectrum capability parameter comprises one or more of the following:
        a quantity of unlicensed spectrums that can be used simultaneously by a serving cell that can be supported by the UE,
        a quantity of unlicensed spectrums and licensed spectrums that can be used simultaneously by the serving cell that can be supported by the UE,
        a spectrum range of an unlicensed spectrum that can be used by the serving cell that can be supported by the UE,
        a spectrum range of an unlicensed spectrum and a licensed spectrum that can be used by the serving cell that can be supported by the UE, or
        a duplex mode that can be used by the serving cell that can be supported by the UE; and
    a processor, configured to configure an unlicensed spectrum serving cell for the UE according to the unlicensed spectrum capability parameter.

4. The base station according to claim 3, wherein:
    the processor is further configured to perform one or more of the following:
        select, according to an unlicensed spectrum list in the unlicensed spectrum capability parameter, at least one spectrum in the unlicensed spectrum list, and/or
        obtain, an unlicensed spectrum that is in the selected unlicensed spectrum and whose bandwidth value is less than or equal to a maximum bandwidth value of an unlicensed spectrum in the unlicensed spectrum capability parameter, and/or
        select a proper quantity of unlicensed spectrums according to the quantity of unlicensed spectrums that can be used simultaneously by a serving cell that can be supported by the UE, and according to the quantity of unlicensed spectrums and licensed spectrums that can be used simultaneously by the serving cell that can be supported by the UE, and/or select an unlicensed spectrum that has a proper spectrum range according to a spectrum range of an unlicensed spectrum that can be used by the serving cell that can be supported by the UE, and according to the spectrum range of an unlicensed spectrum and the licensed spectrum that can be used by the serving cell that can be supported by the UE, and/or select a proper duplex mode according to the duplex mode that can be used by the serving cell that can be supported by the UE; and the processor is further configured to determine the selected unlicensed spectrum as a secondary cell of the UE and configure the secondary cell as the unlicensed spectrum serving cell of the UE.

5. The base station according to claim 3, wherein the processor is further configured to:

when the UE is in a dual-connected state, receive the unlicensed spectrum capability parameter sent by the UE, wherein the dual-connected state refers to a state in which the UE is simultaneously served by two or more base stations;

receive configuration information sent by a secondary base station, wherein the configuration information refers to information about an unlicensed spectrum cell that the secondary base station configures for the UE according to the received unlicensed spectrum capability parameter;

configure an unlicensed spectrum cell for the UE according to the received unlicensed spectrum capability parameter; and send the unlicensed spectrum capability parameter to the secondary base station, and notify the UE of the unlicensed spectrum cells that are configured for the UE separately by the base station and the secondary base station, so that the UE can perform data transmission by using the unlicensed spectrum cells configured by the base station and the secondary base station.

6. A method for reporting an unlicensed spectrum capability when user equipment (UE) is in a dual-connected state, the method comprising:

reporting, by the UE, an unlicensed spectrum capability parameter to a serving base station of the UE, the unlicensed spectrum capability parameter for indicating information about an unlicensed spectrum supported by the UE, and the information comprises a list of unlicensed spectrums supported by the UE and a maximum bandwidth value of each unlicensed spectrum;

wherein the unlicensed spectrum capability parameter comprises one or more of the following:
 a quantity of unlicensed spectrums that can be used simultaneously by a serving cell that can be supported by the UE,
 a quantity of unlicensed spectrums and licensed spectrums that can be used simultaneously by a serving cell that can be supported by the UE,
 a spectrum range of an unlicensed spectrum that can be used by a serving cell that can be supported by the UE,
 a spectrum range of an unlicensed spectrum and a licensed spectrum that can be used by a serving cell that can be supported by the UE, or
 a duplex mode that can be used by a serving cell that can be supported by the UE; and wherein the dual-connected state refers to a state in which the UE is simultaneously served by two or more base stations.

7. The method according to claim 6, wherein reporting an unlicensed spectrum capability parameter to a serving base station of the UE comprises:

sending, by the UE, the unlicensed spectrum capability parameter to the serving base station by using an uplink radio resource control (RRC) message; or sending, by the UE, the unlicensed spectrum capability parameter to the serving base station by using a media access control (MAC) layer message; or sending, by the UE, the unlicensed spectrum capability parameter to the serving base station by using a physical (PHY) layer message.

8. A method for reporting an unlicensed spectrum capability when user equipment (UE) is in a dual-connected state, the method comprising:

receiving, by a base station, an unlicensed spectrum capability parameter sent by user equipment (UE), wherein the unlicensed spectrum capability parameter comprises one or more of the following:
 a quantity of unlicensed spectrums that can be used simultaneously by a serving cell that can be supported by the UE,
 a quantity of unlicensed spectrums and licensed spectrums that can be used simultaneously by a serving cell that can be supported by the UE,
 a spectrum range of an unlicensed spectrum that can be used by a serving cell that can be supported by the UE,
 a spectrum range of an unlicensed spectrum and a licensed spectrum that can be used by a serving cell that can be supported by the UE, or
 a duplex mode that can be used by a serving cell that can be supported by the UE; and configuring, by the base station, an unlicensed spectrum serving cell for the UE according to the unlicensed spectrum capability parameter, wherein the dual-connected state refers to a state in which the UE is simultaneously served by two or more base stations.

9. The method according to claim 8, wherein:

configuring, by the base station, an unlicensed spectrum serving cell for the UE according to the unlicensed spectrum capability parameter comprises:

selecting, by the base station according to an unlicensed spectrum list in the unlicensed spectrum capability parameter, at least one spectrum in the unlicensed spectrum list, and/or setting, by the base station, a bandwidth value of the selected unlicensed spectrum to be less than or equal to a maximum bandwidth value of an unlicensed spectrum in the unlicensed spectrum capability parameter, and/or selecting, by the base station, a proper quantity of unlicensed spectrums according to the quantity of unlicensed spectrums that can be used simultaneously by a serving cell that can be supported by the UE, and according to the quantity of unlicensed spectrums and licensed spectrums that can be used simultaneously by the serving cell that can be supported by the UE, and/or selecting, by the base station, an unlicensed spectrum that has a proper spectrum range according to the spectrum range of an unlicensed spectrum that can be used by the serving cell that can be supported by the UE, and according to the spectrum range of an unlicensed spectrum and a licensed spectrum that can be used by the serving cell that can be supported by the UE, and/or selecting, by the base station, a proper duplex mode according to the duplex mode that can be used by the serving cell that can be supported by the UE; and the method further comprises:

determining, by the base station, the selected unlicensed spectrum as a secondary cell of the UE, and configuring the secondary cell as the unlicensed spectrum serving cell of the UE.

10. The method according to claim 8, wherein configuring, by the base station, an unlicensed spectrum serving cell for the UE according to the unlicensed spectrum capability parameter further comprises:

receiving, by a master base station of the UE when the UE is in a dual-connected state, the unlicensed spectrum capability parameter sent by the UE, wherein the dual-connected state refers to a state in which the UE is simultaneously served by two or more base stations;

configuring, by the master base station, an unlicensed spectrum cell for the UE according to the received unlicensed spectrum capability parameter, and sending the unlicensed spectrum capability parameter to a secondary base station;

receiving, by the master base station, configuration information sent by the secondary base station, wherein the configuration information refers to information about an unlicensed spectrum cell that the secondary base station configures for the UE according to the received unlicensed spectrum capability parameter; and notifying, by the master base station, the UE of the unlicensed spectrum cells that are configured for the UE separately by the master base station and the secondary base station, so that the UE can perform data transmission by using the unlicensed spectrum cells configured by the master base station and the secondary base station.

* * * * *